United States Patent
Uchiyama

[19]

[11] Patent Number: 5,804,785
[45] Date of Patent: Sep. 8, 1998

[54] MOUNTING CONSTRUCTION FOR SWITCHES FOR USE IN A VEHICLE

[75] Inventor: Norio Uchiyama, Tokyo, Japan

[73] Assignee: Niles Parts Co., Ltd., Japan

[21] Appl. No.: 742,835

[22] Filed: Oct. 31, 1996

[30] Foreign Application Priority Data

Nov. 1, 1995 [JP] Japan .................................. 7-308125

[51] Int. Cl.⁶ .................................................. H01H 9/00
[52] U.S. Cl. ..................................... 200/61.54; 200/61.27
[58] Field of Search .............................. 200/61.27–61.29, 200/61.54–61.57; 74/491–495; 70/15–19, 252

[56] References Cited

U.S. PATENT DOCUMENTS

| | | | |
|---|---|---|---|
| 4,404,438 | 9/1983 | Honjo | 200/61.54 |
| 4,423,295 | 12/1983 | Contato | 200/61.27 |
| 4,425,770 | 1/1984 | Mentani et al. | 70/252 |

*Primary Examiner*—Michael L. Gellner
*Assistant Examiner*—Michael J. Hayes
*Attorney, Agent, or Firm*—Rader, Fishman & Grauer; Ronald P. Kananen

[57] ABSTRACT

A housing 3 of an ignition key assembly 1, which is assembled to a steering column 8, is formed in a one piece construction with an arm 6. The arm 6 includes a base 6a and a support 6b. The base 6a extends toward the driver's seat along the underside of the steering column 8. The support 6b extends from the tip of the base 6a and is of a U-shape through which the steering column 8 extends. The support 6b of the arm 6 has seats 6c and 6d to which a turn signal switch 9 and wiper switch 10 are mounted, respectively. The support 6b also has fastening surfaces 6e, 6e and 6d, 6d for mounting the switches 9 and 10, respectively. The mounting construction simplifies the mounting operation of switch units, such as a turn signal switch and a wiper switch, and increases the rigidity of the mounting construction so as to improve the feeling of operating the switches.

8 Claims, 2 Drawing Sheets

5,804,785

MOUNTING CONSTRUCTION FOR SWITCHES FOR USE IN A VEHICLE

BACKGROUND OF THE INVENTION

1. Field of the Invention

The present invention relates to a mounting construction used for mounting switch units, such as a turn signal switch and a wiper switch, around the periphery of a steering column of a vehicle.

2. Description of the Related Art

A conventional arrangement for mounting switch units around the periphery of a steering column is disclosed in Japanese Utility Model Preliminary Publication No. 2-120721. Switch units, such as a turn signal switch and a wiper switch, are fixed to a body made of a resin by means of, for example, screws. The body has a hole that extends in the middle thereof through which a steering column extends. The steering column is inserted through the hole into the body from one longitudinal end of the steering column, and the body is screwed to brackets, for example, welded to the steering column. The steering column incorporates an ignition key assembly in which a steering lock and an ignition switch are integrally assembled. The ignition key assembly is fixed to the steering column independently of the turn signal switch and wiper switch.

The aforementioned prior art has a construction in which the respective switch units and the ignition key assembly are secured to the steering column independently of the other. Thus, the construction is disadvantageous in that a mounting bracket, for example, is required for each of the switch units and ignition key assembly, more parts are required, and the mounting procedure is complex, requiring more labor and time for mounting the components. The turn signal switch and wiper switch are assembled to the resin body which lacks sufficient rigidity and, therefore, the lever switches also lack the feeling of rigidity when operated. In addition, the lever switches must be carefully mounted in order that insufficiently rigid levers, deformed when operated, do not interfere with the surrounding parts. Thus, such a mounting construction places an additional limitation on the layout of parts around the inherently narrow periphery of the steering column.

SUMMARY OF THE INVENTION

The present invention was made in view of the aforementioned drawbacks. An object of the invention is to provide a mounting construction that facilitates the mounting of the respective switch units and increases rigidity of the construction.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to achieve the aforementioned object, the present invention is characterized by a mounting construction in which an ignition key assembly to be fixed to a steering column has an arm and switch units are secured to the arm.

The invention is preferably further characterized by a construction in which the arm of the ignition key assembly has supports between which the steering column extends and the switch units are directly mounted to the supports.

The invention is preferably further characterized by a construction where the arm is formed in a one piece construction with a housing for the ignition key assembly.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

An embodiment of the present invention will be described with reference to the drawings.

Figure 1:
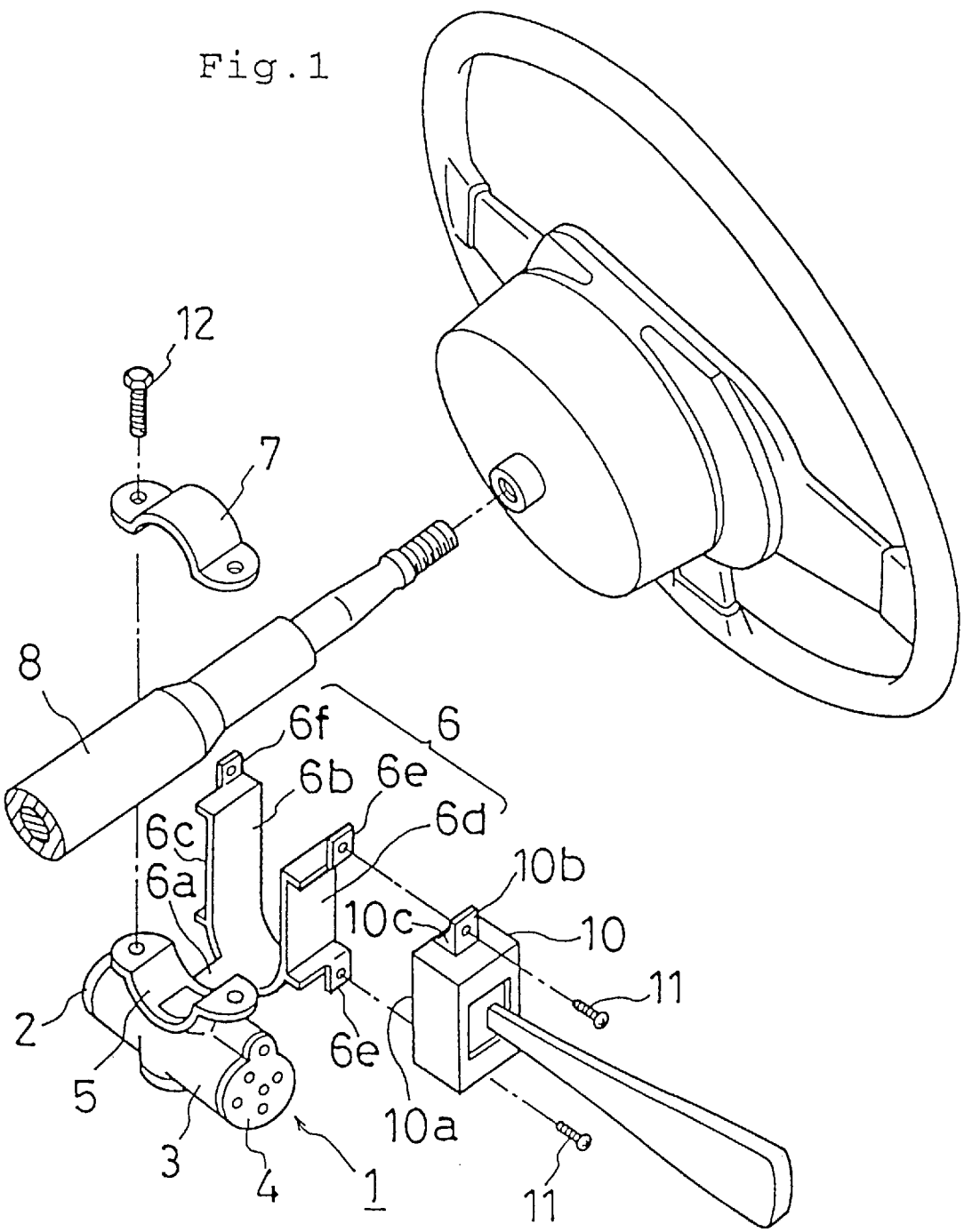
FIG. 1 is a perspective view of a preferred embodiment of an ignition key assembly according to the present invention.
Figure 2:
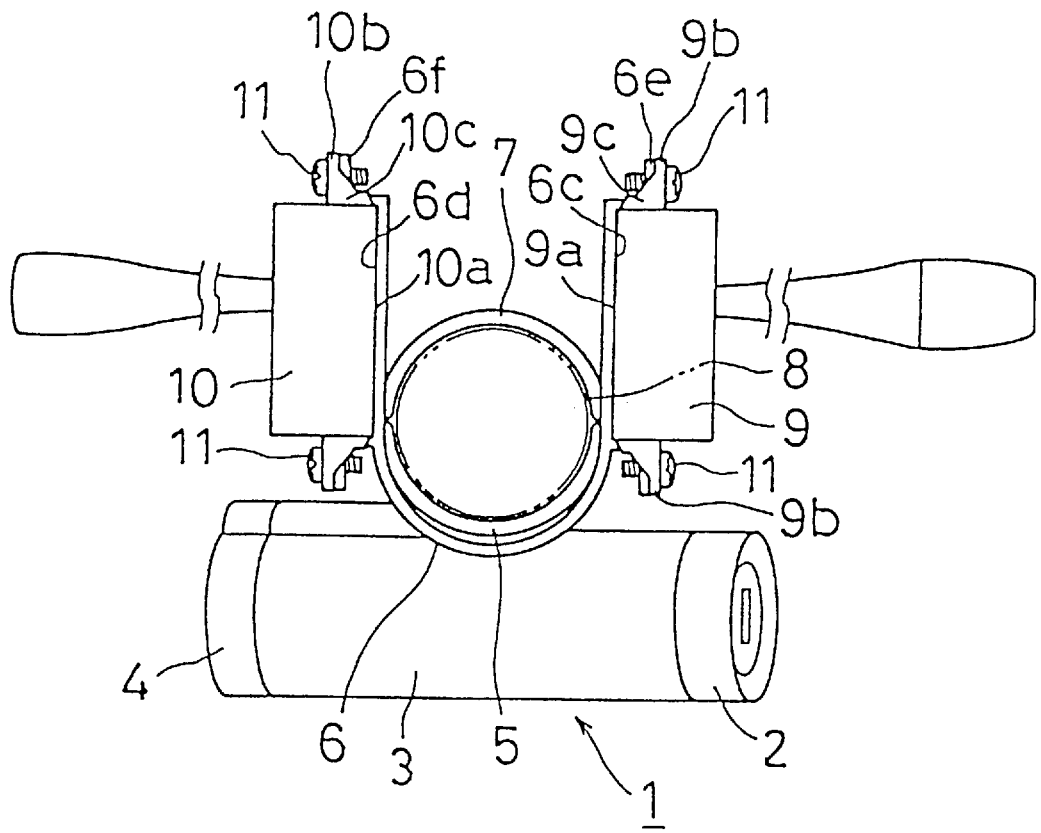
FIG. 2 is a front elevation view of the ignition key assembly shown FIG. 1.
Figure 3:
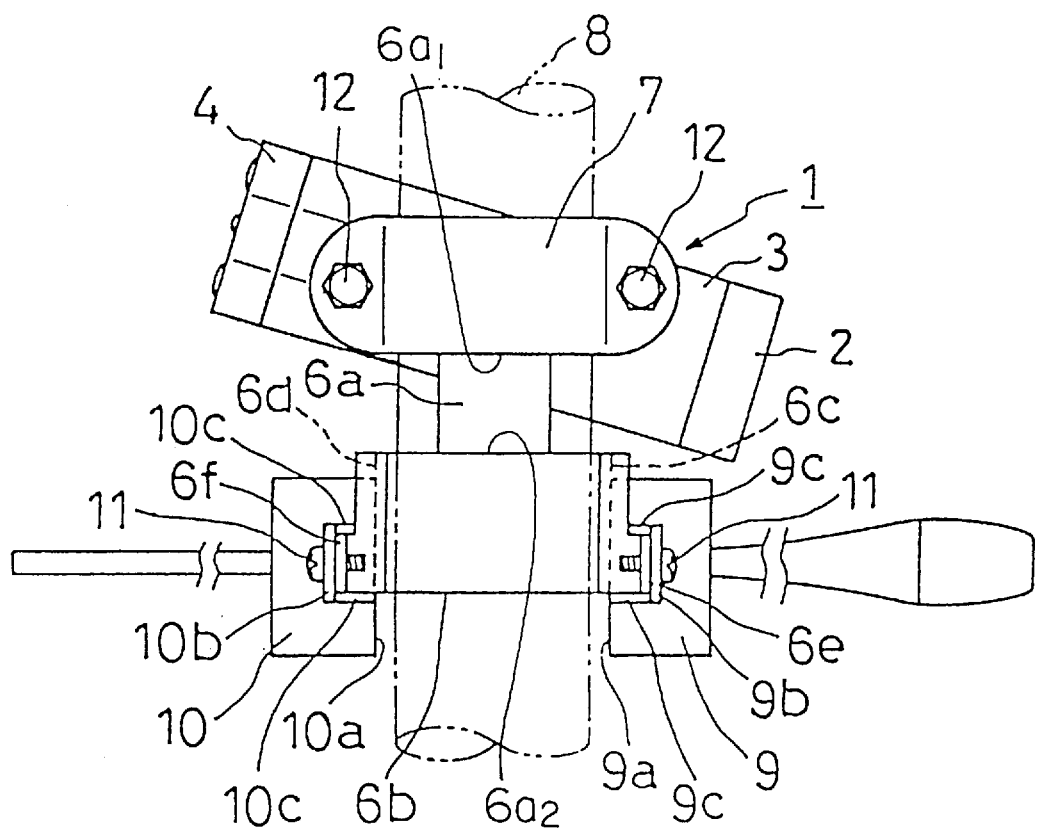
FIG. 3 is a top view of the ignition key assembly shown in FIG. 1.

Referring to FIGS. 1 to 3, an ignition key assembly 1 includes a key cylinder 2, housing 3 for housing the key cylinder 2 therein, ignition switch 4 operated by rotating the key cylinder 2 mounted to the rear end of the housing 3, mounting seat 5 for cooperating with a clamp 7 to hold a steering column 8 therebetween, and arm 6 on which the switch units, including a turn signal switch 9 and a wiper switch 10, are mounted.

The housing 3 is a hollow cylindrical member which houses the key cylinder 2 and ignition switch 4 therein. As mentioned previously, the ignition key assembly 1 carries a steering lock mechanism, not shown, integrally assembled thereon. The steering lock mechanism is a burglarproof mechanism and therefore the housing 3, mounting seat 5, and arm 6 are formed in a one piece construction in, for example, an aluminum die-cast process or a zinc die-cast process. These metal materials are highly rigid so that the housing 3 withstands a large load even if one attempts to destroy the housing 3.

The arm 6 includes a base 6a and a U-shaped support 6b. The base 6a extends from the housing 3 toward the driver's seat along the underside of the steering column 8. The base 6a has a first end $6a_1$, connected to the housing 3, and a second end $6a_2$ connected to the U-shaped support 6b. The U-shaped support 6b has seats 6c and 6d whose surfaces extend upward from the tip of the base 6a in such a way that the steering column 8 extends between the seats 6c and 6d. The seats 6c and 6d receive the bottom surface 9a of the turn signal switch 9 and the bottom surface 10a of the wiper switch 10, respectively. Each of the seats 6c and 6d includes a pair of generally L-shaped parts extending in parallel with each other and outwardly from the upper and lower ends of the seat. Each of L-shaped parts includes a mounting surface 6e, 6e, 6f, 6f.

The U-shaped support 6b is oriented so key cylinder 2, ignition switch 4, and steering lock mechanism, not shown, are first assembled into the housing 3. Then, the respective switch units 9 and 10 are attached to the arms 6 from lateral directions with the bottom surface 9a and 10a of the switch units 9 and 10 abutting the seats 6c and 6d of the arm 6. Then, the flanges 9b, 9band 10b, 10b are fastened to the fastening surfaces 6e, 6e and 6f, 6f by means of screws 11, 11.

The housing 3 having the key cylinder 2, ignition switch 4, turn signal switch 9, and wiper switch 10 assembled thereto is then lifted until the mounting seat 5 abuts the lower surface of the steering column 8. The clamp 7 is placed on the steering column 8 from above so that the clamp 7 faces the mounting seat 5. The clamp 7 and mounting seat 5 are fastened together by means of bolts 12, 12 thus completing the mounting of the ignition key assembly 1 to the steering column 8.

The support 6b is of a U-shape and the free ends of the U-shape extend upward. The free ends define an opening of the U-shape therebetween, allowing the steering column 8 to comfortably extend through the opening so that the integral assembly of the housing 3 and the arm 6 is firmly mounted without difficulty to the steering column 8 from the underside of the steering column 8. The support 6b allows maintaining of the position of the mounting seat 5 relative to the steering column 8 until the clamp 7 is fastened to the mounting seat 5. Therefore, the U-shape of the support 6 improves mounting efficiency.

In the aforementioned embodiment, while the rod-like base 6a extends from the housing 3 and the U-shaped support 6b is formed at the tip of the base 6a, the base 6a may be divided into two parallel parts each of which has an arm at its free end so that each part and the corresponding arm form a generally L-shaped construction. While the arm 6 extends directly from the housing 3, the arm 6 may extend from the mounting seat 5. The base 6a may even be eliminated in some arrangements. The orientation of the opening of a U-shape of the support 6b is not limited to an upward direction but may be selected depending on the mounting direction of the ignition key assembly 1. Further, the positions of the seats 6c and 6d of the support 6b may not be symmetric relative to the steering column 8 but may be asymmetric as required.

As described above, fixedly mounting the switch units to the arm permits the ignition key assembly to be secured to the steering column while eliminating the need for providing a separate bracket on the steering column by means of which the switch units are mounted to the steering column, thereby reducing the total number of parts and assembly steps. The construction allows pre-mounting the respective switch units to the ignition key assembly to form an integral subassembly, thereby eliminating an assembly operation of the switches in a narrow space around the periphery of the steering column as well as improving assembly efficiency.

In the preferred embodiment of the invention, the switch units are directly mounted to the supports provided on both sides of the steering column. This construction eliminates the use of a resin body, which does not have a sufficiently high rigidity.

In the preferred embodiment of the invention, the arm formed in a one piece construction with the highly rigid housing of the ignition key assembly provides high manufacturing efficiency and high rigidity of the arm. This highly rigid construction provides an excellent operation feeling when operating the lever switches, such as the turn signal switch and wiper switch. High rigidity reduces overstroke of the lever of lever switches and, therefore, almost completely eliminates the possibility of the levers interfering with the surrounding parts. Therefore, the construction increases the degrees of freedom in the layout of the parts.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A mounting construction for switches used in a vehicle, wherein an ignition key assembly adapted to be fixed to a steering column has a housing, an arm extending from said housing, and a pair of switch units secured to the arm, said arm having a pair of supports between which a steering column can extend, and the switch units being directly mounted to the supports for positioning on respective sides of a steering column.

2. The construction according to claim 1, wherein the arm is formed in a one piece construction with said housing of the ignition key assembly.

3. A mounting construction for switches used in a vehicle, comprising:

a housing for receiving a key cylinder of an ignition key assembly;

means for mounting the housing to a steering column of a vehicle;

an arm assembly extending from said housing, the arm assembly having a pair of supports between which the steering column extends; and a pair of switch units directly mounted to the supports on respective sides of the steering column.

4. The construction according to claim 3, wherein the arm assembly is formed in a one piece construction with said housing.

5. The construction according to claim 3, wherein the arm assembly comprises a base having a first end connected to said housing and a second end connected to a U-shaped support member.

6. The construction according to claim 5, wherein said supports form opposite sides of said U-shaped support member.

7. The construction according to claim 3, wherein said housing and said arm assembly are assembled with said switch units prior to mounting said housing to a steering column of a vehicle.

8. The construction according to claim 3, wherein said switch units comprise a turn signal switch and a wiper switch.

* * * * *